United States Patent [19]
Forslund et al.

[11] Patent Number: 5,782,420
[45] Date of Patent: Jul. 21, 1998

[54] MOTION LIMITING DEVICE FOR INERTIAL SPOOL BRAKES FOR FISHING REELS

[75] Inventors: Robert L. Forslund, Catoosa, Okla.; David E. Valentine, Ft. Wayne, Ind.

[73] Assignee: Zebco Division of Brunswick Corp., Tulsa, Okla.

[21] Appl. No.: 391,967

[22] Filed: Feb. 21, 1995

[51] Int. Cl.⁶ .................................................. A01K 89/02
[52] U.S. Cl. ................................... 242/289; 242/322
[58] Field of Search ................................ 242/286, 289, 242/312, 322

[56] References Cited

U.S. PATENT DOCUMENTS

| 2,508,217 | 5/1950 | Brell | 242/286 |
| 4,034,859 | 7/1977 | Moosberg | |
| 5,356,090 | 10/1994 | Sato | 242/289 |
| 5,372,324 | 12/1994 | Sato | 242/289 X |

FOREIGN PATENT DOCUMENTS 2257882  1/1993  United Kingdom ............. 242/289

*Primary Examiner*—Daniel P. Stodola
*Assistant Examiner*—Emmanuel M. Marcelo
*Attorney, Agent, or Firm*—Wood, Phillips, VanSanten, Clark & Mortimer

[57] ABSTRACT

A centrifugally actuated braking system on an end flange of the line spool of a bait cast reel. A series of raised lands or stops on the end flange cooperates with projections on the brake pads mounted on radiating brake arms to limit radial movement of the centrifugally actuated brake pads. Orthogonal brake arms are joined by an arcuate section which rides in an annular groove in the spool shaft. Additional weights for increasing braking power may be slidingly mounted on the brake arms behind the brake pads. A retainer ring sliding onto the spool shaft holds the brake arms in place. An inner lip on the retainer ring rides in a second annular groove in the spool shaft to hold the retainer ring in its locking position on the shaft.

19 Claims, 3 Drawing Sheets

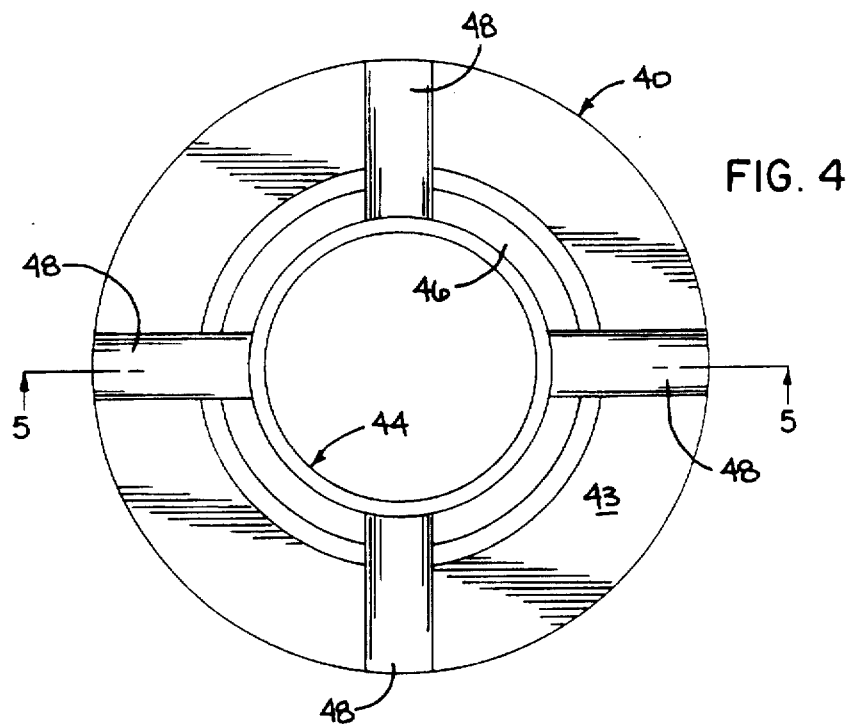
FIG. 4
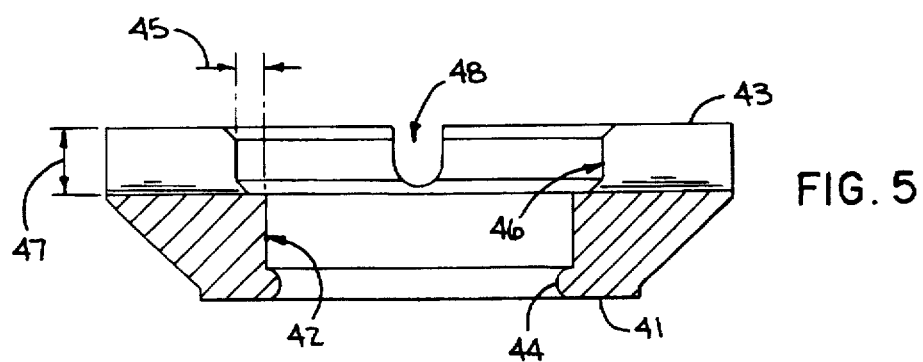
FIG. 5
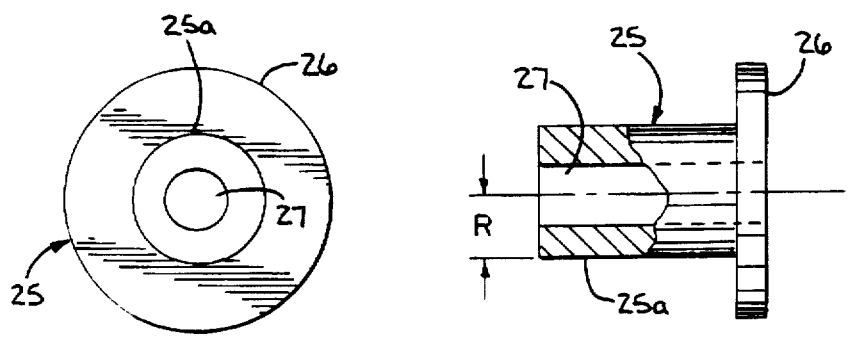
FIG. 6
FIG. 6A

MOTION LIMITING DEVICE FOR INERTIAL SPOOL BRAKES FOR FISHING REELS

FIELD OF THE INVENTION

The invention is broadly within the field of fishing reels but is particularly adapted for embodiment in bait cast or level wind type reels. The invention is of an improved centrifugally actuated system for braking the spin of the line spool of such reels and is specifically related to the structure of such systems.

BACKGROUND OF THE INVENTION

The invention is an improved centrifugal spool braking system. One such system is disclosed and claimed in U.S. Pat. No. 4,917,321 issued Apr. 17, 1990 to Dennis E. Roberts and assigned to Zebco Corporation, the assignee of this application. In such systems, braking elements or pads are slidingly mounted upon arms which extend radially from a hub of the line spindle to a position adjacent an annular braking surface which is attached to the housing of the reel. When the spool spins, the brake pads are forced outwardly by centrifugal force and into contact with the annular braking surface. This braking action slows the spin of the spool initiated by casting action and often held responsible for undesired backlash of the fishing line which tangles about the reel spool.

One objective of the invention is to provide a structure that permits the braking system, or a part thereof, to be disengaged without removing the elements of the system from the reel.

Another objective of the invention is to enable the addition or removal of weights to the braking system to increase or decrease the braking power of the system.

A further objective of the invention is to refine the structure which holds the radially extending arms of the braking system in operating position on the reel and simplifies assembly of the brake.

SUMMARY OF THE INVENTION

In keeping with the several objectives of the invention set forth above, the invention has several separate but interrelated facets.

The structure provided to enable the user to disengage the centrifugal braking system comprises a stop or barrier positioned between the spool supporting shaft of the reel and the annular braking surface on the housing reel; and, a radial extension of the brake pad configured to engage the stop and thereby limit outwardly movement of the pad.

In the preferred embodiment of the invention, the braking system arms are attached to the spool shaft and extend outwardly adjacent to the face of the line spool flange opposite the crank handle side of the reel. The stop or barrier comprises an annular raised ridge extending axially outwardly of the outer face of the spool flange. The brake pad comprises a cylindrical body with a bore therein sized to loosely accept its associated arm, and the radial extension which engages the stop ridge comprises a flange on the inner end of the brake pad.

A very significant aspect of the invention is the fact that the brake pad flange may be moved from one side of the stop ridge to the other without removing the brake arms from their assembled position on the reel. This is possible in that the arms are flexible enough and the brake pad flanges are narrow enough so that an arm may be sprung away from the spool flange far enough to permit the brake pad mounted thereon to be slid in or out until its flange is on the desired side of the annular stop ridge. The arm may then be released and will return to its original operating position as described below. It should also be noted that in the same manner weights can be placed upon or removed from the brake arms. Such weights may be slidingly positioned on the brake arms radially inward of the brake pads. Brake weights may be cylindrical or may include a flange to permit them to be stopped from exerting centrifugal force on their associated brake pads.

Another aspect of the invention is the structure of the brake arms and the means for retaining them in their operating position on the reel. Two pair of intersecting orthogonal arms are utilized resulting in four arms, each 90° apart. Each pair of arms is joined at their intersection by an arcuate section configured to fit within an annular receiving groove in the spool shaft. The groove is located adjacent to the spool flange and an inner portion of the arms lies against the spool flange when the arcuate section is within the groove. A retaining ring traps the arcuate portion of the arms in the grooves and the inner portion of the arms against the spool flange.

Still another aspect of the invention is the structure of the retaining ring and the manner in which it is held on the spool shaft. The retaining ring has a bore therethrough sized to closely fit the spool shaft. Within this bore there is an annular inwardly extending lip, configured to lie within a second annular groove in the spool shaft. The retainer ring and lip are sized so that the ring and lip may be pressed onto the shaft until the lip is in its receiving groove. Tightness of the fit holds the retaining ring and inner portion of the brake arms in place against the outer face of the spool flange.

BRIEF DESCRIPTION OF THE DRAWINGS

FIG. 4 is a plan view of a retainer ring of the invention;

FIG. 5 is a cross-sectional side elevation of the retainer ring of the invention taken along line 5—5 of FIG. 4;

FIG. 6 is a plan view of a brake pad of the invention;

FIG. 6a is an end view of the brake pad of FIG. 6;

DETAILED DESCRIPTION OF THE PREFERRED EMBODIMENT

Figure 1:
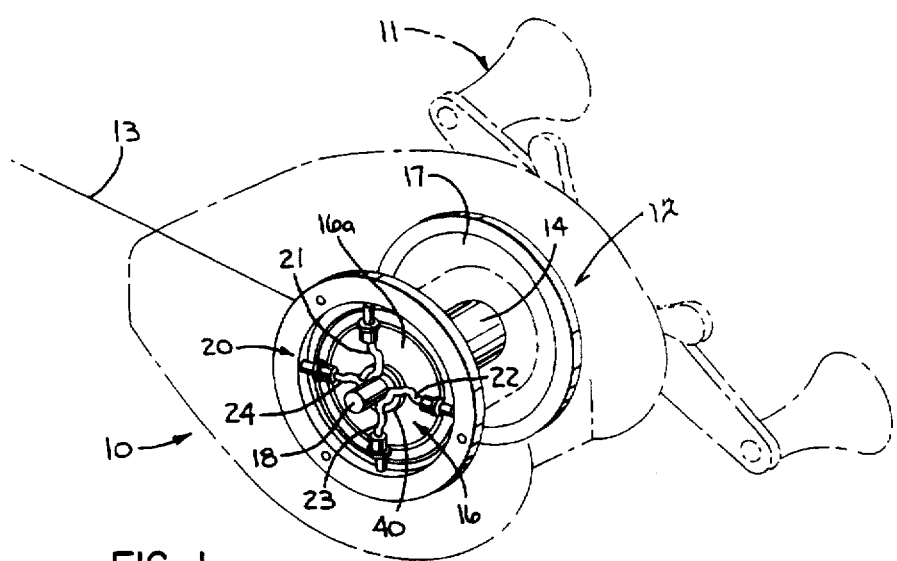
FIG. 1 is a perspective view of a fishing reel, partially in phantom, with a centrifugal brake system for a line carrying spool according to the present invention.
Figure 2:
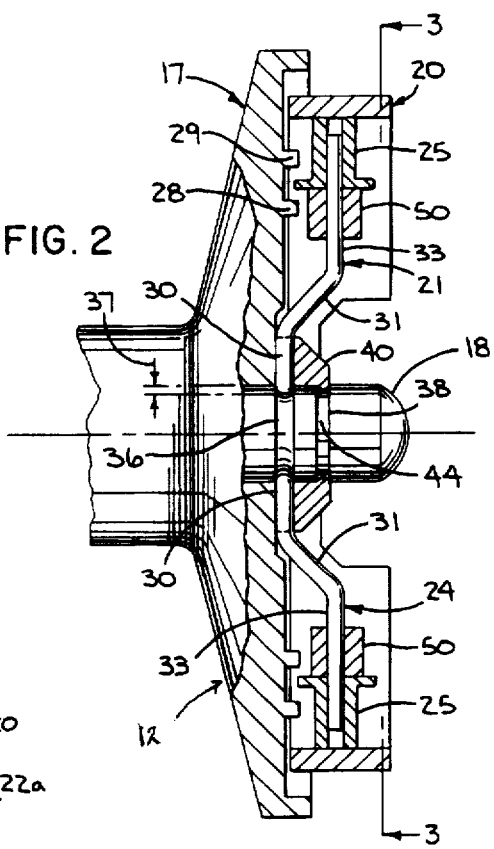
FIG. 2 is an enlarged, fragmentary side elevation of the reel of FIG. 1, particularly cut away and in cross section, illustrating the brake system of the invention.

Referring to FIGS. 1 and 2, the bait cast reel housing 10 and hand crank 11 are shown in phantom enclosing a line spool 12 upon which the fishing line 13 is wound. The spool 12 is supported for rotation within the housing 10 by a spool shaft 18 and by suitable bearing means (not shown). Rotation of the hand crank 11 turns the spool 12 to wind up the line 13. However, the spool may be permitted to free-wheel when casting in a manner known in the art. The spool 12 is made up of a cylindrical center portion 14 with flanges 16, 17 at opposite ends.

Brake arms 21, 22, 23 and 24 are mounted on the spool shaft 18 between the face 16a of the flange 16 and an annular retainer 40 which snaps over the open end of the spool shaft 18 as explained below.

The arms 21 and 22 (see FIG. 3) comprise a unitary structure joined where they intersect at their inner ends by an arcuate section 32. A similar arcuate section 34 joins brake arms 23 and 24. Stainless steel wire is suitable for bending into the illustrated structure of the arms 21,22 and 23,24. An annular groove 36 sized to receive the arcuate sections 32 and 34 of the arms 21–24 is cut into the spool shaft 18. When the brake arms 21–24 are assembled onto the reel, the arcuate sections 32 and 34 ride partially within the groove 36.

The inner approximate one fourth 30 of the arms 21–24 and their arcuate sections 32 and 34 lie in a common plane and the groove 36 is positioned so that when sections 32 and 34 lie therein, the inner portions 30 of the arms 21–24 lie against with the face 16a of the spool flange 16.

The middle approximate one fourth 31 of the arms 21–24 angle outwardly away form the face 16a of the flange 16 so that the outer approximate one half 33 of the arms 21–24 will clear the annular stop ridges 28 and 29.

The outer approximate one half 33 of the arms 21–24 lie in a plane parallel to the force 16a of the flange 16.

Figure 3:
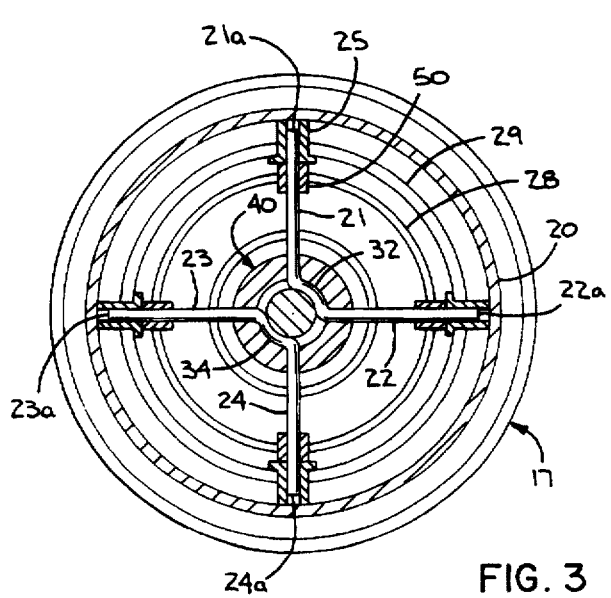
FIG. 3 is a view, partially in cross section, of the brake system of the invention taken along line 3—3 of FIG. 2.

Referring to FIGS. 1–3, a brake pad 25 is slidingly mounted on each brake arm 21–24. The brake pad 25 (see FIG. 6) comprises a cylindrical body 25 made of plastic, preferably L-grade ABS or nylon, having a bore 27 therethrough sized to loosely receive a brake arm and an end flange 26. the brake pad 25 must slide easily upon its supporting brake arm.

A raised annular stop ridge 28 extends outwardly from the face 16a of the flange 16. The height of the ridge 28 is determined by the radius R of the brake pad 25, it being imperative that the body 25a of the pads 25 be free to move over the ridge 28. A flange 26 at the inner end of each pad 25 overlaps the ridge 28 as seen in FIG. 2 so that the ridge 28 limits the movement of the pads 25 on the arms 21–24.

It is intended that the arms 21–24 be flexible enough that their outer ends 21a–24a may be sprung by hand away from the face 16a of the flange 16 sufficiently to permit the pads 25 and thin flanges 26 to pass over the stop ridge 28; but, upon release, the arms 21–24 will return to a position where the body 25a of the pad 25 will pass over the ridge 28 but the flange 26 will not. The ridge 28 is so located that when the flange 26 of a pad 25 is inside the ridge 28, the pad 25 will not make contact with the annular braking surface 20 on the reel housing 10 so that the centrifugal brake system is inactivated.

FIG. 5 illustrates a retainer ring 40 which hold the arms 21–24 in their operating position on the reel. The retainer 40 has an axial bore 42 therethrough sized to snugly fit the spool shaft 18, a flat inner face 43 with an annular undercut 46 equal in width 45 and depth 47. The width 47 of the undercut 46 and the depth 37 of the groove 36 should together equal the thickness of the wire making up the arms 21–24 and their arcuate sections 32,34 to assure a snug assembly.

The retainer 40 has an inwardly projecting annular lip 44 sized to fit within a second annular groove 38 in the spool shaft 18. The depth of the groove 38 and the height of the lip 44 should be substantially equal. The retainer 40 must be sufficiently deformable to permit it to be slid onto the shaft 18 and be retained in its assembled position by the action of the lip 44 fitting within the groove 38.

When in its assembled position on the reel, the inner face 43 of the retainer 40 is preferably flush against the face 16a of the flange 16, the arcuate sections 32, 34 of the arms 21–24 are trapped between the groove 36 in the spool 18 and the undercut 46 of the retainer 40. The arms 21–24 project outwardly through radial passages 48 provided therefor in the face 43 of the retainer 40. When so assembled, the inner portion 30 of the arms 21–24 are snugly held against the face 16a of the flange 16.

Referring to FIG. 3, additional weights 50 may be added to the assembly by sliding them onto the brake arms 21–24. The weights 50 may have the same general shape as the brake pads 25 but need not have a flange like flange 26 on the brake pack 25. The function of the weights 50, if used, is to increase the braking power of the system by increasing centrifugal force between the brake pads 25 and the annular brake surface 20.

Figure 7:
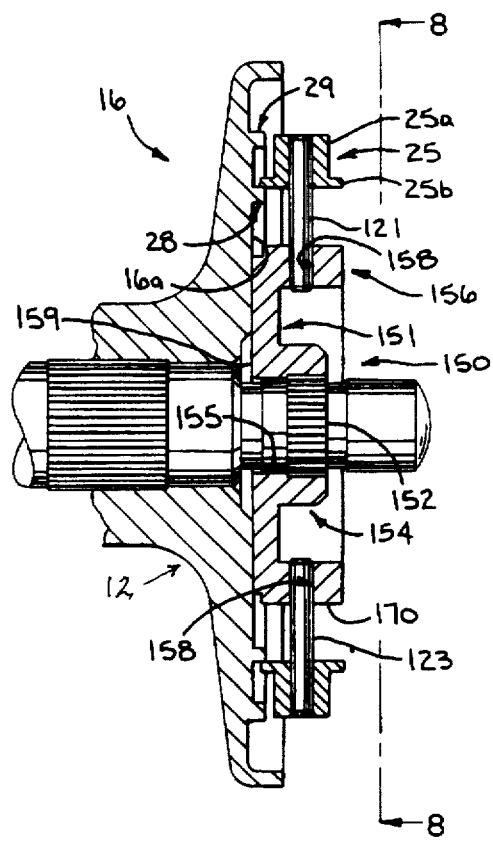
FIG. 7 is a cross-sectional view of an alternative embodiment of the invention.
Figure 8:
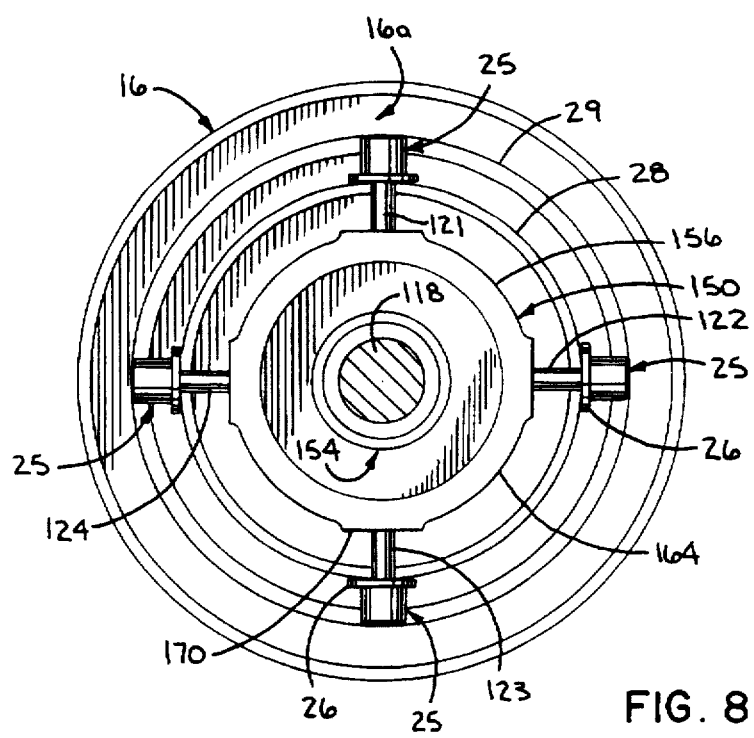
FIG. 8 its an end view of the device of FIG. 7 taken along line 8—8 of FIG. 7.

FIGS. 7 and 8 illustrate another, and currently preferred, embodiment of the invention. In this embodiment, brake arms 121–124 and associated brake pads 25 are supported by an annular retainer 150 which is press fitted onto the spool shaft 118.

The retainer 150 is a unitary piece, preferably molded from ABS or nylon, comprising a hub 154, a flange-like circular element 151 extending outwardly from the hub 154 and an outer peripheral wall 156 extending axially of the flange 151 in the same direction as the hub 154.

The hub 154 has a bore 155 extending axially therethrough sized to tightly receive therein the spool shaft 118. When assembled to the reel 10, the inner face 159 of flange 151 is flush against the outer face 16a of the spool flange 16 and is retained in this position by the interaction of serrations 152 on the spool shaft 118 and the wall of the bore 155 through the hub 154.

Four short brake arms 121–124 extend from the wall 156 along radials from the hub 154 positioned 90° apart. The brake arms 121–124 are press fitted into bores 158 in the wall 156. Brake pads 25 freely slide on the brake arms 121 in the same manner as upon brake arms 21–24 described above in relation to FIGS. 1–3. The brake arms 121–124 are positioned in the wall 156 so that when the retainer 150 is assembled on the spool shaft 118 with its flange face 159 against the outer face 16a of the spool flange 16, the brake arms 121–124 will be positioned apart from the annular ridges 28 and 29 a distance sufficient to permit the cylindrical body 25a of the brake pads 25 to pass over the ridges 28 and 29; yet close enough so that the flanges 26 thereof will engage the ridges 28 and 29 when the pads 25 slide in and out on the brake arms as described above. The material and structure of the retainer 150 and assembled brake arms 121–124 may be sufficiently flexible as to permit the flange 26 of any one of the brake pads 25 to be moved over the inner ridge 28 without removing the hub 154 from the spool shaft 118.

Referring to FIG. 8, the wall 156 may be reinforced in the area of the bores 158 where the brake legs 121–124 penetrate the wall 156. This may be accomplished by flaring the outer surface 164 of the wall 156 to form a small boss 170 around each of the bores 158. The diameter of the boss should be approximately equal to the diameter of the flange 26 of the brake pad 25.

For the sake of simplicity, the annular braking surface 20 described in relation to FIG. 2 has been omitted from FIGS. 7 and 8, but is a required element of the invention as described above.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a bait cast fishing reel having a housing, a line carrying spool having a cylindrical body with a radially extending flange at each end, a spool shaft supporting the spool for rotation with respect to the housing and a centrifugal braking system for the spool comprising an annular brake surface on the housing, a plurality of brake arms mounted on and extending radially of the spool shaft, a plurality of brake pads slidingly mounted upon the brake arms for movement thereon into and out of engagement with the brake surface and means for retaining the brake arms on the spool shaft, an improvement comprising:

means for limiting the radial movement of a brake pad upon a brake arm comprising, a structural member extending radially of the brake pad and a first stop means attached to and extending from one of the reel housing and a spool flange to a preselected position between the braking surface and the spool shaft for engaging the structural member extending radially from the brake pad and thereby limiting the radial movement of the brake pad upon the brake arm.

2. The improvement of claim 1 wherein the first stop means extends axially outwardly of a spool flange.

3. The improvement of claim 2 wherein the first stop means comprises a ridge on the outer face of the spool flange.

4. The improvement of claim 3 wherein the ridge is arcuate.

5. The improvement of claim 4 wherein the arcuate ridge is concentric with the brake surface.

6. The device of claim 1 further comprising a second stop means attached to and extending from one of the reel housing and a spool flange to a preselected position between the braking surface and the spool shaft and positioned sufficiently radially inwardly of the first stop means as to prevent the brake pads from making contact with the brake surface when the structural member, extending radially of the brake pad is positioned radially inwardly of the second stop means.

7. The improvement of claim 6 wherein the brake pads have a preselected length and the distance between the second stop means and the braking surface exceeds the length of the brake pads.

8. The improvement of claim 6 wherein the second stop means extends axially outwardly of a spool flange.

9. The improvement of claim 8 wherein the second stop means comprises a ridge on the outer face of the spool flange.

10. The improvement of claim 9 wherein the ridge is arcuate.

11. In a bait cast fishing reel having a housing, a line carrying spool having an elongate body with a radially extending flange at each end, a spool shaft supporting the spool for rotation with respect to the housing and a centrifugal braking system for the spool comprising an annular brake surface, a plurality of elongated brake arms extending radially of the spool shaft, a plurality of brake pads slidingly mounted upon the brake arms for radial movement into and out of engagement with the brake surface and means for attaching the brake arms to the spool shaft comprising:

a hub having a bore therethrough sized to receive therein the spool shaft;

means for retaining the hub on the shaft;

a brake arm retainer spaced radially outwardly from the hub;

means for connecting the brake arm retainer to the hub;

means for attaching the brake arms to the brake arm retainer; and means extending from a spool flange for limiting the outward radial movement of the brake pads upon the brake arms;

said limiting means comprising an annular stop ridge extending outwardly from the spool flange toward the brake arms, said brake pads comprising a body and a protrusion extending radially from the body of each of the plurality of brake pads, the brake arms being spaced sufficiently distant from the stop ridge to permit the body of the brake pads to pass over the ridge when sliding on the brake arms and sufficiently close to the stop ridge that the protrusion from the body of the brake pads will not pass over the ridge, whereby sliding movement of the brake pads on the brake arms is limited.

12. The fishing reel of claim 11 wherein the means for attaching the brake arms to the brake arm retainer comprises a plurality of radial bores in the retainer sized to receive the brake arms therein and means for securing the brake arms within the bores, and wherein the brake arm retainer comprises a boss surrounding each of the bores so as to reinforce the brake arm retainer where the brake arms are received therein.

13. The fishing reel of claim 11 wherein the means for connecting the brake arm retainer to the hub comprises at least one structural member extending radially outwardly from the hub to the brake arm retainer and connected to the hub and the brake arm retainer and wherein the means for retaining the hub on the shaft is in radial alignment with the longitudinal axes of the elongated brake arms.

14. The fishing reel of claim 13 wherein the means for connecting the brake arm retainer to the hub comprises a circular element extending radially from the hub to the retainer.

15. The fishing reel of claim 14 wherein the flange at one end of the reel spool comprises a substantially planar outer surface and wherein the circular element connecting the hub and brake arm retainer is flush against the flat outer surface of the spool flange.

16. The fishing reel of claim 13 wherein the hub, brake arm retainer and means for connecting the brake arm retainer to the hub comprises a unitary structure.

17. The fishing reel of claim 11 wherein the means for attaching the brake arms to the spool shaft is sufficiently flexible as to allow a brake arm to be sprung outwardly of the spool flange to allow the protrusion from the body of a brake pad sliding mounted thereon to pass over the annular stop ridge, and upon release to return to its original position.

18. In a bait cast fishing reel having a housing, a line carrying spool having a cylindrical body with a radially extending flange at each end, a spool shaft supporting the line spool for rotation with respect to the housing and a centrifugal braking system for the spool comprising an annular brake surface on the housing, a plurality of brake arms extending radially of the spool shaft, a plurality of elongated brake pads slidingly mounted upon the brake arms for radial movement into and out of engagement with the brake surface, one of the end flanges comprising a flat outer side surface and said brake arms being disposed generally parallel to said surface, means for limiting the motion of the brake pads upon the brake arms comprising at least one annular raised ridge extending from the flat outer side surface of the flange to a position adjacent to but apart from the brake arms, and means extending laterally of the elongated brake pads for engaging said annular ridge so as to limit the range of sliding motion of the brake pads upon the brake arms.

19. The fishing reel of claim 18 further comprising means for supporting the brake arms upon and for rotation with the spool shaft and wherein said supporting means is sufficiently flexible to permit a brake arm to be sprung away from the spool surface so that the engaging means extending from a brake pad may be moved from one side of the ridge to the other as the brake pad is slid along the brake arm.

* * * * *